United States Patent
Viertal et al.

[11] Patent Number: 5,417,467
[45] Date of Patent: May 23, 1995

[54] COLLAPSIBLE SUN VISOR FOR VEHICLES

[75] Inventors: Lothar Viertal, Altforweiler, Germany; Patrick Welter, La Chambre, France; Gabriel Stricher, Laning, France; Didier Cauchois, Guerting, France

[73] Assignee: Gebr. Happich GmbH, Wuppertal, Germany

[21] Appl. No.: 127,624

[22] Filed: Sep. 27, 1993

[30] Foreign Application Priority Data

Oct. 15, 1992 [DE] Germany .............. 42 34 741.6

[51] Int. Cl.⁶ ............................................. B60J 3/02
[52] U.S. Cl. ................................... 296/152; 296/97.4; 296/97.8; 160/84.06; 160/370.23
[58] Field of Search .............. 296/97.1, 97.4, 97.8, 296/152; 160/84.1 E, 370.2 B, DIG. 3

[56] References Cited

U.S. PATENT DOCUMENTS

| | | | |
|---|---|---|---|
| 1,804,864 | 3/1930 | Ellis . | |
| 2,234,804 | 8/1938 | Murray . | |
| 3,003,812 | 10/1961 | Haugland | 296/97.8 X |
| 4,836,263 | 6/1989 | Ament | 296/152 X |
| 5,042,550 | 8/1991 | Yee | 160/370.2 B X |
| 5,067,765 | 11/1991 | Frye et al. | 296/97.8 |

FOREIGN PATENT DOCUMENTS

| | | |
|---|---|---|
| 0455844 | 5/1990 | European Pat. Off. . |
| 2630977 | 1/1988 | France . |
| 2359718 | 11/1973 | Germany . |
| 3904367 | 2/1989 | Germany . |
| 4014057 | 5/1990 | Germany . |
| 9102274 | 2/1991 | Germany . |
| 2205794 | 6/1987 | United Kingdom . |

*Primary Examiner*—Dean J. Kramer
*Attorney, Agent, or Firm*—Ostrolenk, Faber, Gerb & Soffen

[57] ABSTRACT

A sun visor for a vehicle window, particularly a side window thereof, includes a sun visor body fastened at its top to a top profiled strip and at its bottom to a bottom support in the form of a spring bar. The bottom support is movable so as to bring the sun visor body from a collapsed non-use position to a spread out use position and vice versa. The visor body is comprised of a series of strips which together define a fan like body. A swing lever is pivoted to one end of the profiled strip and includes a guide web extending along the length of the swing lever. One end region of the bottom support for the visor body is received in a displacable manner along the guide web so that swinging of the swing lever moves the guide web which moves the bottom support to move the visor body between its use and non-use positions. The end of the bottom support away from the swing lever is fixed to the top profiled strip. An over center spring arrangement on the swing lever assures that the visor body swings completely between the non-use and use positions.

20 Claims, 5 Drawing Sheets

COLLAPSIBLE SUN VISOR FOR VEHICLES

BACKGROUND OF THE INVENTION

The present invention relates to a sun visor for vehicles, particularly for arrangement behind a side window of a motor vehicle, having a sun visor body which is fastened at its top to a profiled strip and at its bottom to a spring bar, and which can be adjusted, like a widenable fan, from a compact position of non-use into a position of use spread out over a window.

A sun visor of this type is shown in Federal Republic of Germany Publication 40 14 057 C1. That known sun visor is primarily intended to screen off a top front corner region of a window opening of a side door above a mirror triangle. Frequently, however, it is desired that a relatively wide upper edge region of a side window, particularly in the region adjacent to the B column of a vehicle, be screened off over a large area. This is because the head of the driver or of the passenger sitting in the front seat is closer to the rear region of the window opening of the front side door than to the front corner region of that window opening. In the case of a sun visor which screens off only the front corner region of the window opening, the driver and the front seat passenger are substantially unprotected from the lateral entrance of the rays of the sun.

SUMMARY OF THE INVENTION

The object of the invention is to provide a sun visor of the aforementioned type to screen the side window over the largest possible area, particularly at the rear region of the window, so as to protect the driver and/or the front seat passenger against the rays of the sun which enter the vehicle from the side.

In order to achieve this object, the features of the invention are now described. The invention concerns a sun visor for a vehicle window, and particularly a side window. It includes a sun visor body fastened at its top to a top support preferably in the form of a profiled strip and at its bottom to a bottom support preferably in the form of a stiff, but resilient spring bar. The bottom support is movable so as to bring the sun visor body from a collapsed, compact, non-use position to a spread out fanned out, open, use position, or vice versa. The visor body is comprised of a series of strips which together define a fan like or corrugated design so that it is foldable to the compact and openable to the spread out positions.

A swing lever is pivoted to one end of the profiled strip. The lever has a guide web that extends along the length of the swing lever. One end region of the bottom support for the visor body includes engaging means which are received in a displacable manner along the guide web so that swinging of the swing lever moves the guide web which moves the bottom support to move the visor body between its positions. The end of the bottom support away from the swing lever is fixed to the top profiled strip. An over center spring arrangement on the swing lever causes the visor body to move between the fully closed collapsed and fully opened positions. A particular advantage of the invention resides in the fact that effective protection against sun rays can be obtained by merely operating a lever handle.

The invention affords the advantage of being able to screen off the region of the upper edge of a side window along a continuous horizontal path in order to screen the driver both from rays of the sun which enter laterally from in front and from rays which enter solely from the side.

The sun visor of the invention may consist of only a few parts, is simple to manufacture, is compact, easy to mount and easy to handle.

Other features and advantages of the present invention will become apparent from the following description of the invention which refers to the accompanying drawings.

BRIEF DESCRIPTION OF THE DRAWINGS

FIG. 7 shows a detail X of FIG. 2 in exploded view;

DETAILED DESCRIPTION OF THE INVENTION

Figure 1:
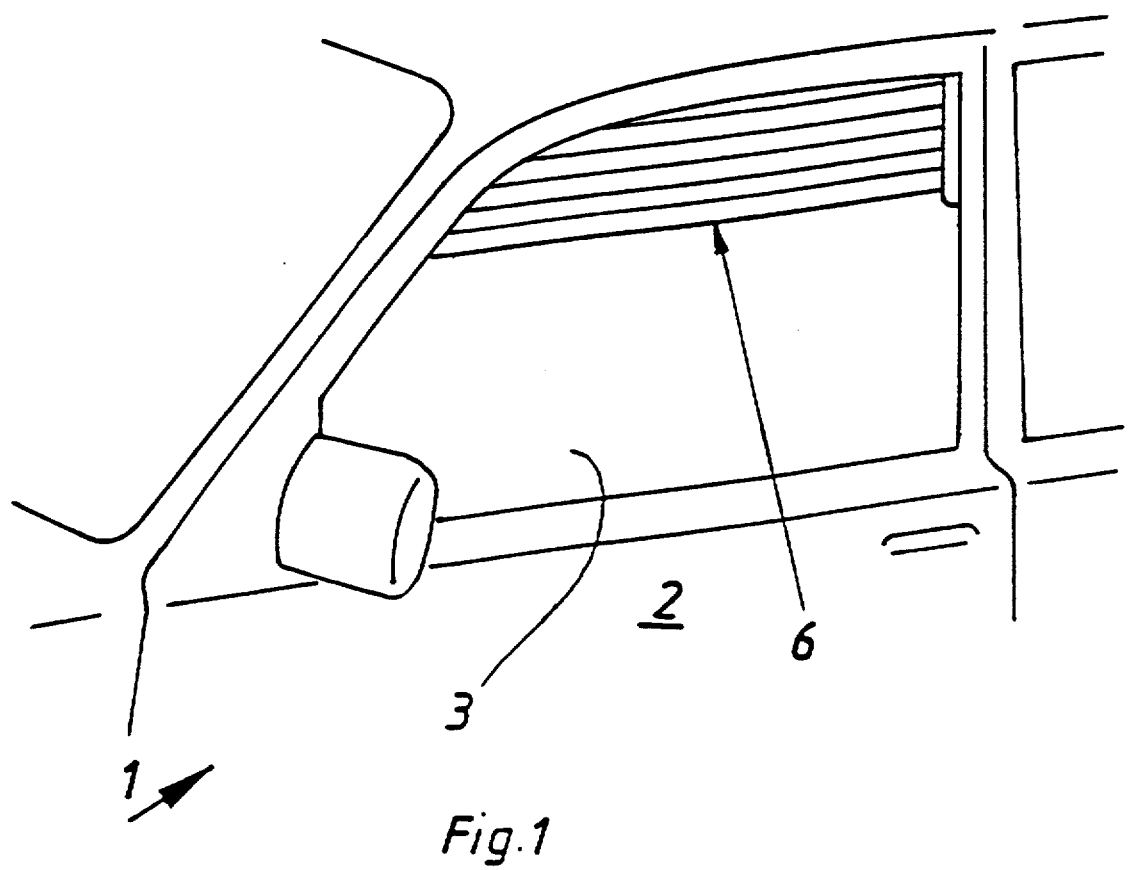
FIG. 1 shows a sun visor arrangement with the sun-visor body in the installed condition, shown in its position of use.
Figure 2:
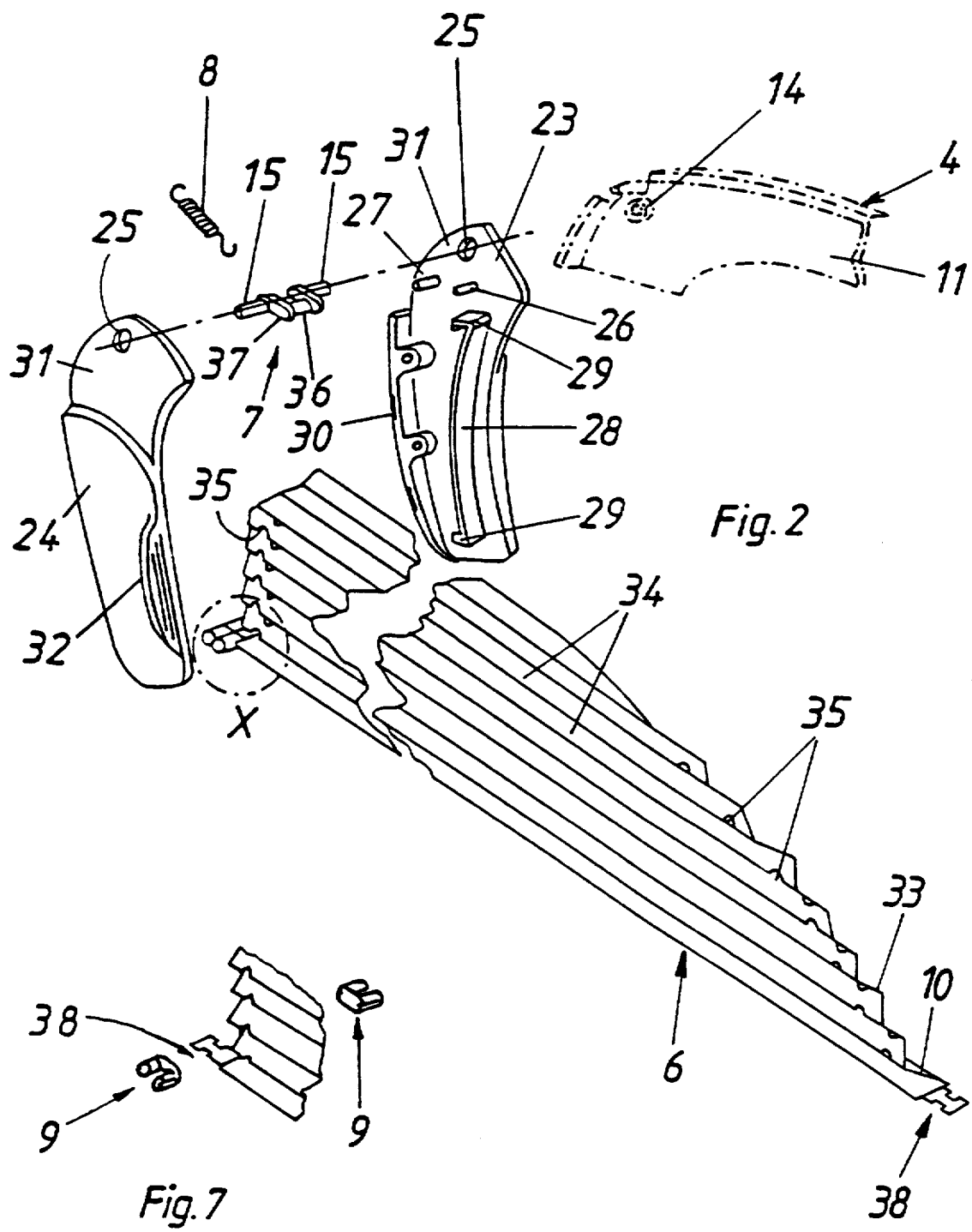
FIG. 2 is a exploded perspective view of the sun visor.
Figure 3:
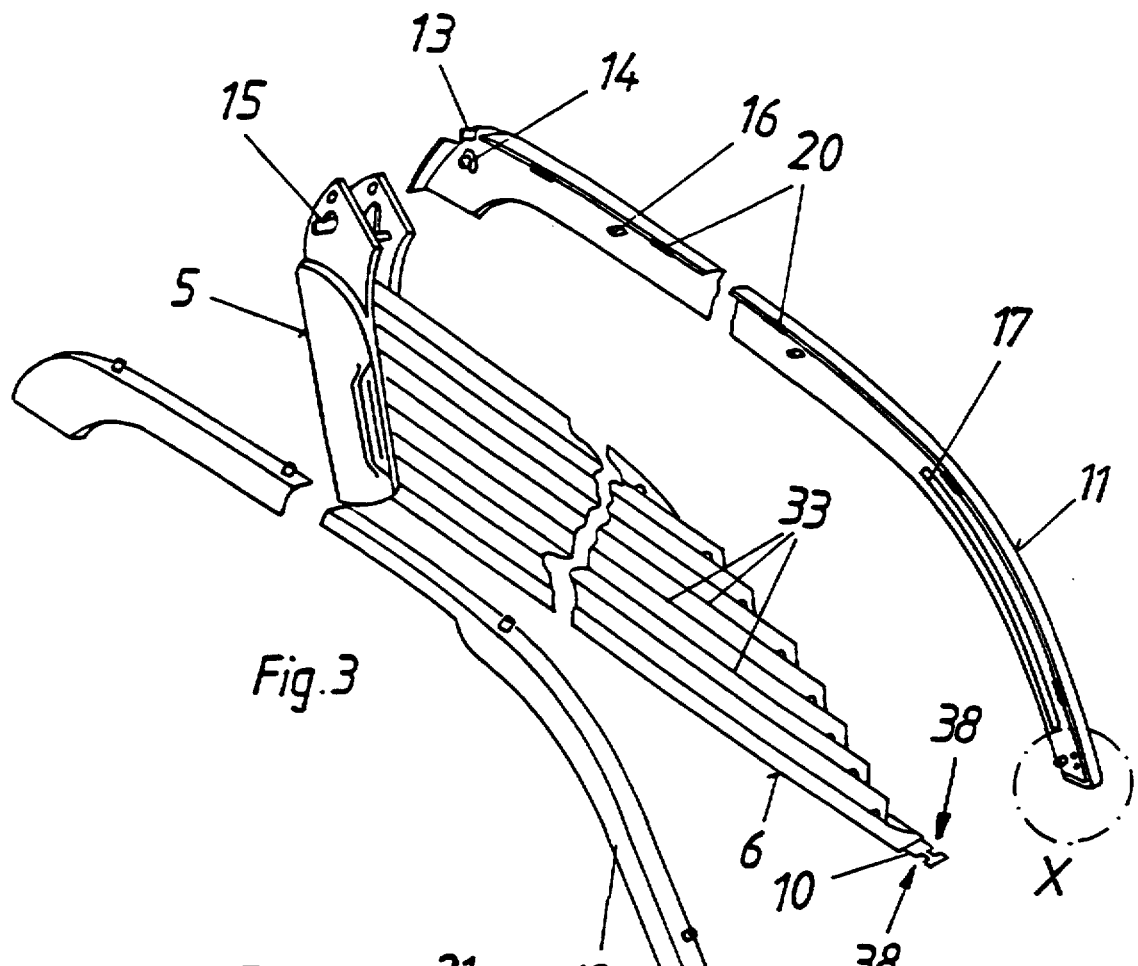
FIG. 3 is another exploded perspective view of the sun visor.
Figure 4:
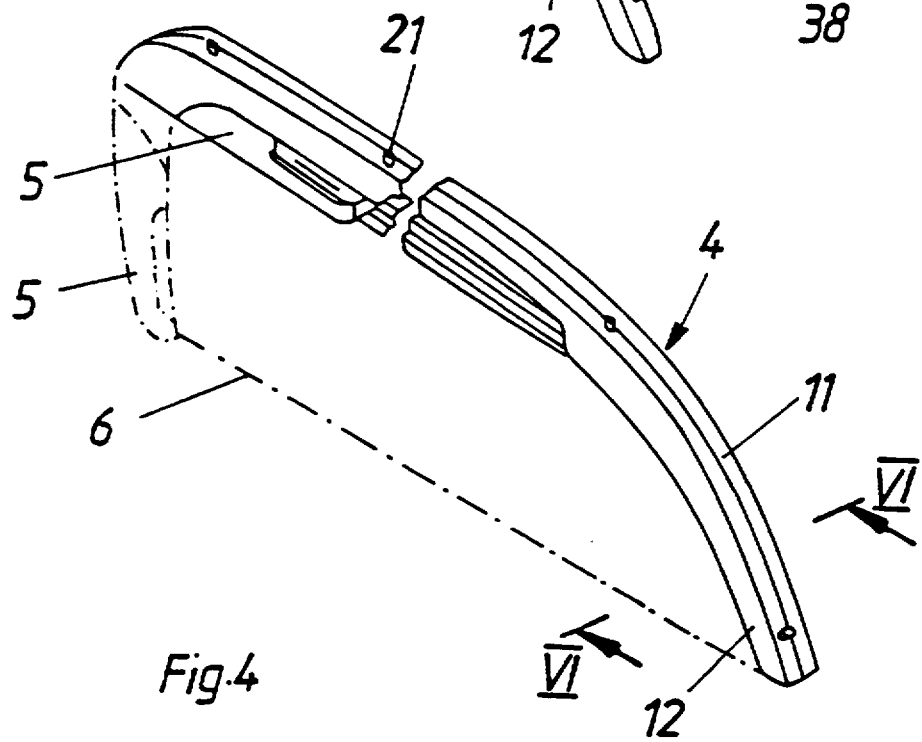
FIG. 4 shows the sun visor according to FIGS. 2 and 3 after assembly together of the individual parts.
Figure 8:
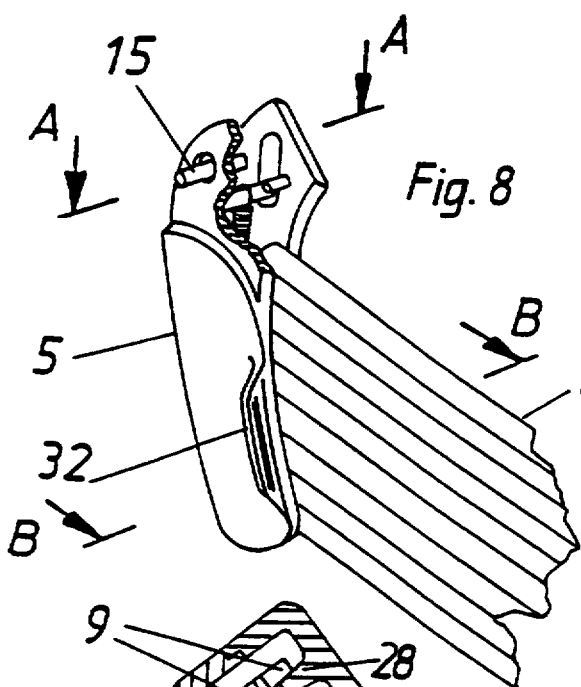
FIG. 8 shows a portion of the sun visor with swing lever.
Figure 10:
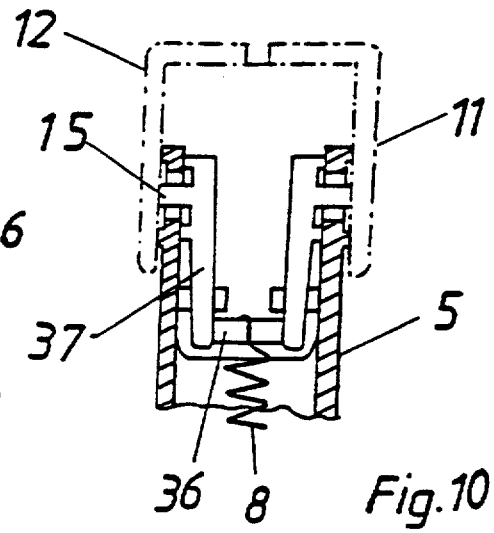
FIG. 10 is a section along the line A—A of FIG. 8.
Figure 9:
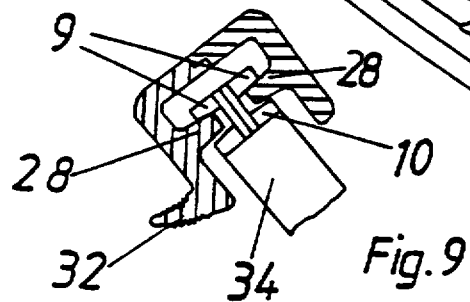
FIG. 9 is a section along the line B—B of FIG. 8.
Figure 6:
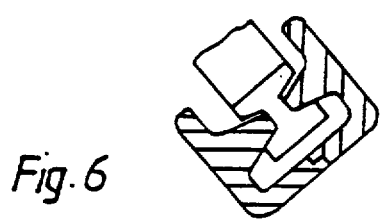
FIG. 6 is a section along the line VI—VI of FIG. 4.
Figure 14:
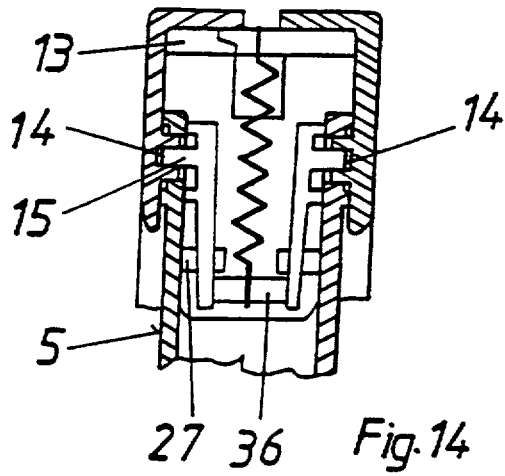
FIG. 14 is a section along the line D—D of FIG. 11.
Figure 5:
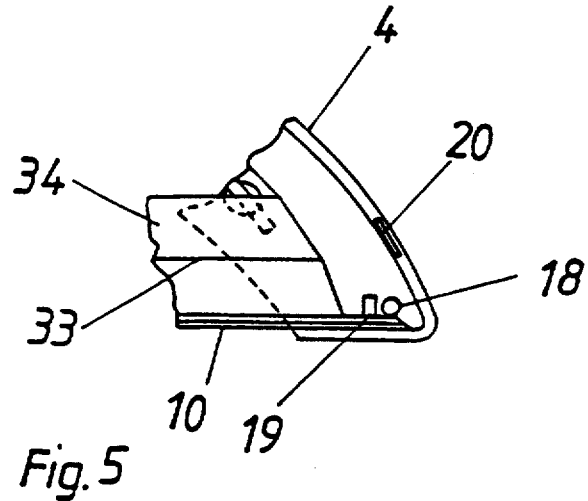
FIG. 5 is a detail X from FIG. 3.
Figure 13:
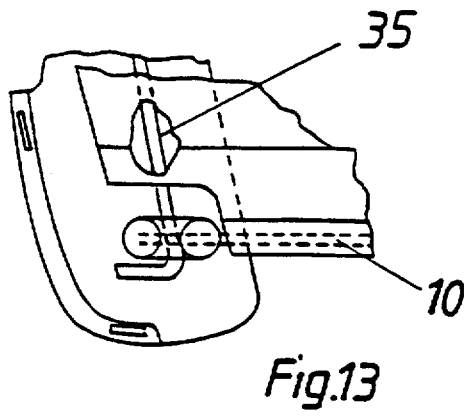
FIG. 13 shows a detail X from FIG. 11.

FIG. 1 shows a vehicle 1 having a side door 2 including a side window 3. The upper edge region of the window is screened off over a relatively wide area by a sun visor according to the invention.

The sun visor of the invention is comprised of a top support profiled strip 4, a swing lever 5, a sun visor body 6, a connecting rod 7, a tension spring 8, two slide elements 9, and a bottom support spring bar 10.

Figure 11:
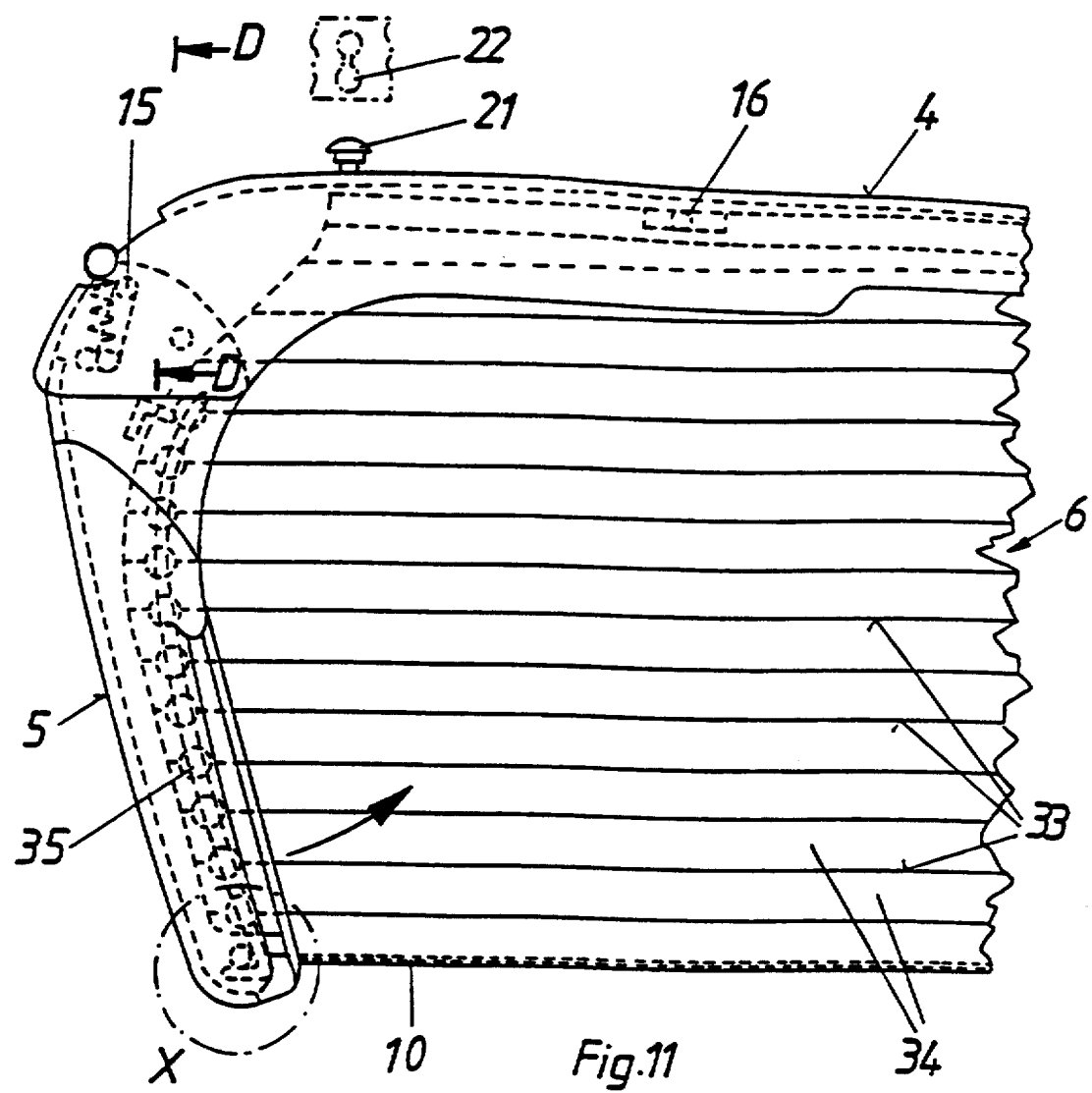
FIG. 11 shows the swing lever end region of the sun visor, shown in the position of use.

The top support for the visor body comprises a profiled strip 4 which is developed generally as a rail of U-shaped cross section. It preferably has a curved end region for following the contour of the upper frame profile of the side door 2. The profiled strip 4 is divided through its longitudinal plane such that it is comprised of two halves 11 and 12, each formed as a plastic injection molding. Each of the halves 11 and 12 of the strip 4 has a respective, inwardly projecting pin 13 and the pins together receive one end of a tension spring 8. Each half also includes a mounting receiver 14 for a respective connecting rod pin 15. There are pins 16 and guide webs 17 for holding the halves 11 and 12 together with the sun visor body 6 between them. There are pins 18 and webs 19 for holding the bottom support spring bar 10, described below, at the end of the halves 11 and 12 that are remote from the swing lever 5. Weld zones 20 are developed on the halves 11 and 12 at which the halves 11 and 12 are fastened to each other, preferably by ultrasonic welding, after assembly of the sun visor. Pins 21 having mushroom heads are provided on the upper closure wall of the profiled strip 4 for simple attachment of the sun visor to the frame of the car door. There is a corresponding hole pattern 22 in the door frame, as shown in dash-dot line in FIG. 11.

The swing lever 5 also has a generally U-shaped cross section. The lever 5 is also divided along the longitudinal plane to be formed of two halves 23, 24, each developed as a plastic injection molding. Each swing lever half is provided with a respective mounting hole 25 for the passage of a respective connecting rod pin 15. Each swing lever half has two respective, inwardly projecting pins 26, 27 formed on it which serve alternately as driving and stop pins for the connecting rod 7. Each swing lever half has a respective, inwardly projecting guide web 28 that extends in the longitudinal direction of the swing lever 5 and is limited at both ends by stops 29. The guide web 28 engages and guides movement of the slide elements 9 and thereby of the bottom support spring bar 10 and the fan strips 34, described below. Weld zones 30 on the swing lever halves enable their attachment together. The swing levers have stepped down end flaps 31 which engage in the profiled strip 4. The swing lever half 24 has a hand grip zone 32 developed on it.

Figure 12:
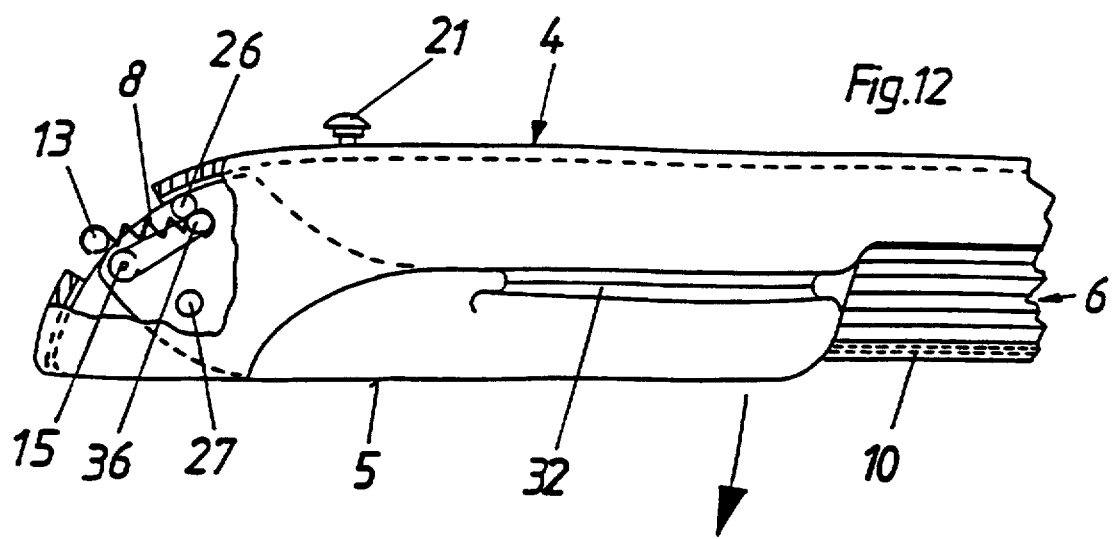
FIG. 12 shows the swing lever end region of the sun visor, shown in position of non-use.

The sun visor body 6 comprises a cut or stamped portion of a plastic extrusion body with fan folding places or corrugations 33 developed as film hinges between the fan strips 34. The fan strips 34 lie one upon the other when the sun visor is in the collapsed together position of non-use (FIG. 12), while the strips extend in zig zag corrugated shape in the extended or spread out position of use of the sun visor. During its manufacture, the sun visor body is provided along its top with a course which is adapted to the profiled strip 4 and it is further provided with free cuts 35 which are provided both along the region of the edge adjacent the profiled strip 4 as well as along the region of the edge adjacent the swing lever. The free cuts 35 are spaced alongside each other in the region of the fan folding places 33 and extend across the pieces 34.

The connecting rod 7 comprises a plastic extrusion which carries the outwardly projecting connecting rod pins 15 and, extending parallel to those pins and on an offset axis, like a crank, a connecting rod web 36 for having one end of the tension spring 8 suspended from the web 36. The straps 37 connect the connecting rod pins 15 to the connecting rod web 36 and cooperate with one or the other of the pins 26, 27 by selectively abutting one of them. The pins serve as abutments for the connecting rod 7.

The bottom support for the visor body comprises a spring bar 10 which is preferably formed of a portion of a stiff but resilient or springy spring steel tape. It is provided with U-shaped cutouts 38 on its free ends and those ends extend on both sides beyond the fan strips. The spring bar 10 is connected to the lowermost fan strip for instance, by being glued to it. On its end toward the swing lever 5, the spring bar 10 supports the slide elements 9 in the region of the U-shaped cutouts 38. The two slide elements at each side of the spring bar 10 are slightly separated to receive the guide web 28 between them.

Before the two halves 11 and 12 of the profiled strip 4 and the two halves 23 and 24 of the swing lever 5 are ultrasonically welded together, the individual parts of the sun visor are installed. First one half of the profiled strip 4 and one half of the swing lever 5 are provided with the parts by pushing the connecting rod pin 15 through the support hole 25 into the mounting receiver 14, then pressing the free cuts 35 in the sun visor body 6 onto the pins 16 and guide webs 17, 28, and then pressing a slide element 9 on the guide web 38. After the halves have been welded together, the sun visor is ready for installation. One end of the tension spring is attached to the connecting rod web 36 and the other end of the spring is attached to the receiving pin 13. The opposite end of the spring bar 10 away from the slide elements 9 and the lever 5 grips under the pins 18 of the profiled strip 4, while the webs 19 of the strip 4 engage into the U-shaped cutouts 38.

The sun visor can be brought from the collapsed position of non-use (FIG. 12) into the spread out position of use (FIG. 11), or vice versa, by actuating the swing lever. In the non-use position of the visor body, the swing lever is in a swung up position generally along the length of the profiled strip 4. Upon the downward swinging of the swing lever 5 to a swung down position generally across the length of the strip 4, the connecting rod 7 is pushed downward by the upper pin 26 in the swing lever, which swings the bar 36 away from the pins 13 and tensions the tension spring 8. After a certain path of swing, the connecting rod 7 passes beyond the so called dead center, and the tension on the spring 8 pulls the rod 7 against the second pin 27 and thus completes pulling the swing lever 5 into the lower end position at which the sun visor body 6 is in the position of use. The sun visor body is positively carried along through this swinging movement by the guide webs 28 arranged on the swing lever 5 engaging the slide elements 9 on the spring bar 10 and pulling the elements down.

Reverse swinging of the swing lever pivots the second pin 27 against the rod 7 until the rod is over dead center, and then the spring 8 raises the lever 5 and the visor body 6 the rest of the way to the collapsed non-use condition.

The spring bar 10, which is connected to the lower fan strip 34, produces a convex bending with pressure upon the closing of the fan like body. As a result, in the closed condition, the convex shaping is brought about by the overall concept of tension spring 8, connecting rod 7, mounting places and turning movement of swing lever 5, and the fan remains in this shape in the closed position.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for a vehicle window comprising
   a sun visor body which is collapsible into a non-use position and is extendible from the non-use position into a spread out position of use for covering a window, the sun visor body having a top and a bottom which are spread apart as the visor body is moved to the position of use and are moved together as the visor body is brought to the non-use position;
   a top support at the top of the visor body; a bottom support at the bottom the visor body;
   a swing lever swingably attached to the top support for being swung between a swung up position generally along the length of the top support wherein the visor body is held in the non-use position and a swung down position generally across the length of the top support wherein the visor body is held in the position of use; the swing lever having a guide means thereon extending along the swing lever and swingable with the swinging of the swing lever;

the bottom support having an engaging region located at the swing lever and including engaging means at the engaging region for engaging the guide means on the swing lever, whereby as the swing lever is swung up toward the swung up position, the engaging means moves along the guide means which collapses the visor body to the non-use position and as the swing lever is swung down to the swung down position of use, the engaging means moves along the guide means to spread the visor body to the position of use;

means for holding the swing lever in the selected position of use or non use.

2. The sun visor of claim 1, wherein the bottom support has a second region away from the engaging region and the second region of the bottom support is fastened against being displaced to the top support of the visor body.

3. The sun visor of claim 2, wherein the engaging means on the bottom support is toward one end of the bottom support while the other end of the bottom support is fastened to the top support.

4. The sun visor of claim 3, wherein the bottom support comprises a spring bar of stiff but springy material.

5. The sun visor of claim 4, wherein the visor body is foldable in a corrugated fan, leaf arrangement, collapses into a non-use position and opens by fanning out into a spread out position of use.

6. The sun visor of claim 2, wherein the sun visor body is comprised of a fan like body with a series of pieces which are held to each other at fan folding places for enabling the fan like body to be collapsed to the non-use position at the fan folding places and to be stretched to the position of use.

7. The sun visor of claim 1, wherein the visor body is foldable in a corrugated fan, leaf arrangement and collapses into a non-use position and opens by fanning out into a spread out position of use.

8. The sun visor of claim 1, wherein the top support for the visor body comprises a profiled strip having one end region at the swing lever and a second end region away from the swing lever and the second end region away from the swing lever being curved generally toward the bottom to generally correspond to the contour of the upper frame profile of a door of a vehicle in which sun visor is to be installed the sun visor body being shaped along its top corresponding to the contour of the profiled strip.

9. The sun visor of claim 8, wherein the bottom support has a second region away from the engaging region and the second region of the bottom support is fastened against being displaced to the top support of the visor body;

the engaging means on the bottom support is toward one end of the bottom support while the other end of the bottom support is fastened to the top support.

10. The sun visor of claim 8, wherein for fastening the sun visor body to the profiled strip and to the swing lever, the sun visor body has an edge region adjacent to the profiled strip with cuts therein; further cuts being defined in the visor body;

holding elements defined on the profiled strip engaging the cuts;

further webs formed on the swing lever engaging the further cuts defined in the visor body.

11. The sun visor of claim 10, wherein the sun visor body is comprised of a fan like body with a series of pieces which are held to each other at fan folding places for enabling the fan like body to be collapsed to the non-use position at the fan folding places and to be stretched to the position of use; the cuts being formed on the folding places.

12. The sun visor of claim 1, wherein the swing lever is pivoted to the top support.

13. The sun visor of claim 12, wherein there is a pivot bearing axis for the pivoting of the swing lever, a connecting rod at the axis and the connecting rod being swingable independently of the swing lever; two spaced apart abutments on the swing lever and the connecting rod being disposed between the abutments, such that one of the abutments pushes the connecting rod to swing while the other abutment limits the extent of swing, depending upon the direction of the swinging of the swinging lever;

a tension spring connected between the connecting rod and the top support, the spring is tensioned as the swing lever and the connecting rod together swing over a center position and the spring causes the connecting rod together with the swing lever to continue swinging beyond the center position, with one of the abutments pushing the connecting rod over the center position and the other abutment limiting the extent to which the connecting rod moves beyond the center position as the swing lever swings between the positions thereof.

14. The sun visor of claim 13, wherein the top support comprises a profiled strip having a U-shaped cross section divided along its longitudinal plane and formed in two halves; elements formed integrally on the profiled strip for supporting the spring, the independently swingable connecting rod connected with the spring, the bottom support and the visor body.

15. The sun visor of claim 14, wherein the guide means for the engaging means of the bottom support comprises a guide web defined on the swing lever.

16. The sun visor of claim 15, wherein the swing lever has a U-shaped cross section and is divided along its longitudinal plane to define two attached together halves; the tension spring, the end region of the bottom support with the engaging means thereon and a side wall of the visor body being located within the swing lever.

17. The sun visor of claim 16, wherein the halves of the profiled strip are-welded to each other and the halves of the swing lever are welded to each other.

18. The sun visor of claim 1, wherein the guide means for the engaging means on the bottom support of the visor body comprises a guide web defined in the swing lever which is engaged by the engaging means on the bottom support and the engaging means sliding along the guide web as the swing lever and the guide web are swung between the positions of the swing lever.

19. The sun visor of claim 18, wherein the guide web is comprised of two individual webs located respectively on the halves of the swing lever and the webs defining a slot opening between the two webs;

the engaging means on the bottom support comprise slide elements fastened to the bottom support in the region of the webs on the swing lever for engaging the web and sliding therealong as the swing lever moves between the positions thereof.

20. The sun visor of claim 1, further comprising a grip zone defined on the swing lever for being gripped for moving the swing lever between the positions thereof.

* * * * *